Nov. 20, 1923.
A. H. HARRIS
SHACKLE FOR VEHICLE SPRINGS
Original Filed Dec. 9, 1920
1,474,361
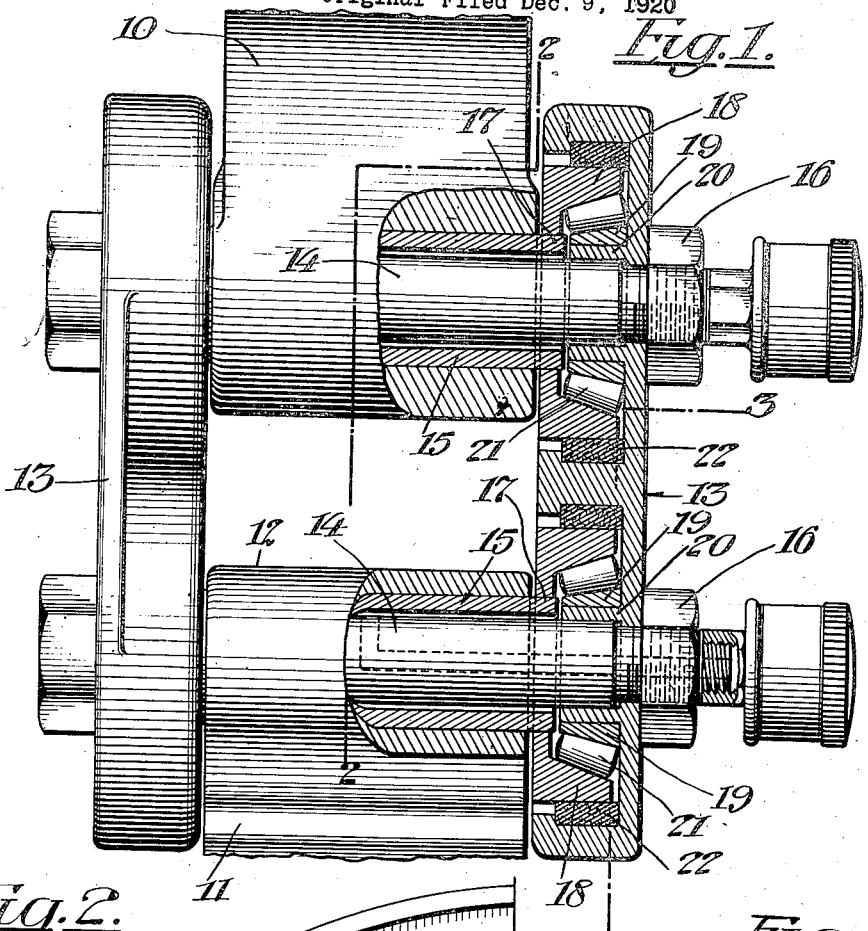
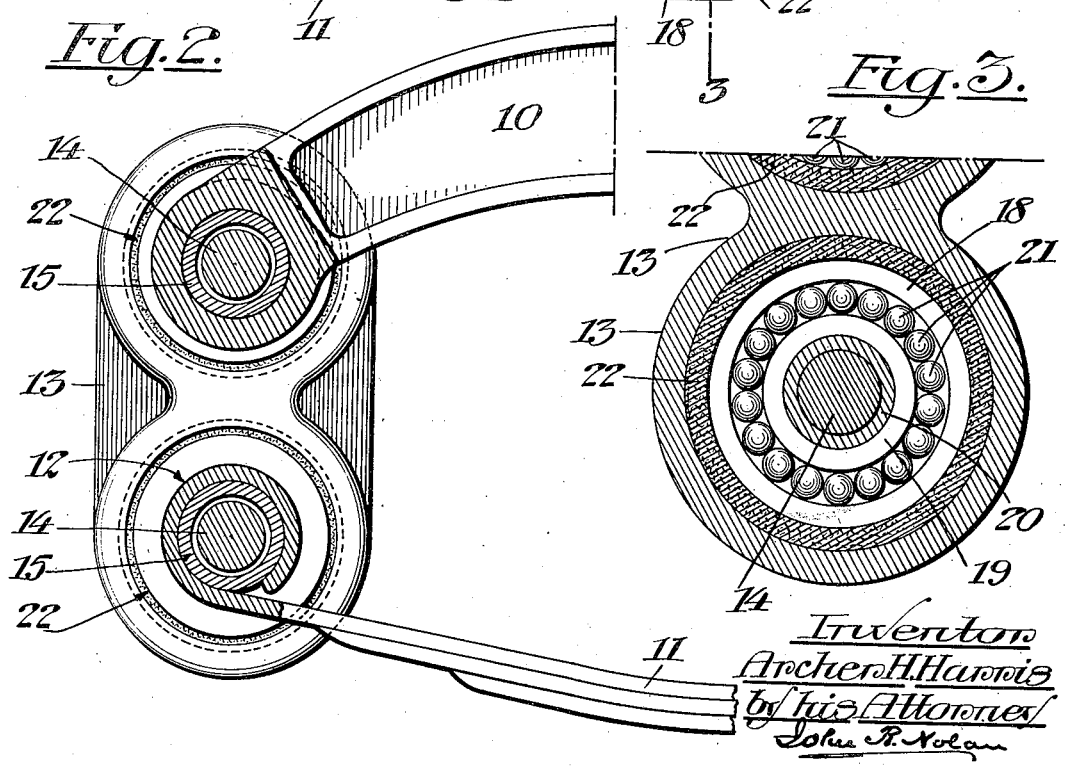
Inventor
Archer H. Harris
by his Attorney
John P. Nolan Patented Nov. 20, 1923.

1,474,361

UNITED STATES PATENT OFFICE.

ARCHER H. HARRIS, OF BARBERTON, OHIO, ASSIGNOR TO HOWARD C. HARRIS, OF AKRON, OHIO.

REISSUED

SHACKLE FOR VEHICLE SPRINGS.

Application filed December 9, 1920, Serial No. 429,312. Renewed August 5, 1922. Serial No. 579,949.

*To all whom it may concern:*

Be it known that I, ARCHER H. HARRIS, a citizen of the United States, and resident of Barberton, in the county of Summit and State of Ohio, have invented certain new and useful Improvements in Shackles for Vehicle Springs, of which the following is a specification.

This invention relates to shackles for vehicle springs, and more especially the laminated supporting springs of automobiles.

The object of my invention is to provide a shackle of such construction that the wear or friction at the connections of the shackle with the spring and supporting element, resulting from the compression and rebound of the spring, is minimized; and that the ready adjustment of the members of the shackle which are subjected to end thrust, can be effected in order to take up wear and thus prevent "side slap" of the spring.

Accordingly my invention consists in various novel features of construction and combinations of parts which will be hereinafter described and claimed.

In the drawings—

Figure 1 is an end elevation, partly in vertical section, of a shackle embodying the principle of my invention.

Fig. 2 is a vertical section of the construction, as on the line 2—2 of Fig. 1.

Fig. 3 is a vertical section through one of the antifriction bearings of the shackle, as on the line 3—3 of Fig. 1.

Referring to the drawings, 10 designates a supporting element, such, for example, as one end of a side bar of an automobile frame; and 11 designates a portion of a laminated spring which is flexibly connected at one end, 12, to the frame bar by my improved shackle. This shackle comprises two substantial side members 13 which are supported in spaced parallel relation to each other, and are arranged to embrace the bar 10 and also the end of the spring. In the present instance the shackle is illustrated as connecting the outer end of the spring with the outer end of the frame bar, but the shackle can, of course, be employed to connect the opposite end of the spring with the body of the frame bar. In fact, in practice, two shackles are employed for the respective ends of the spring.

The side members are maintained in spaced relation to each other by upper and lower cross-pins, preferably constituted by bolts 14, which are freely encircled by sleeves or bushings 15 interposed between the two members, the nuts 16 which are screwed on one end of the bolts, bearing against the outer face of the proximate side member. The upper bushing is fast in the end (or body) of the bar 10 so as to provide a mounting attachment therefor, and the lower bushing is fixedly held in the end coil 12 of the spring. The respective ends of each of these bushings extend outward somewhat beyond the adjacent bar or spring, as at 17, and to each projecting end of a bushing is affixed the ring section 18 of a ball or roller bearing. This section encircles a complementary bearing section constituted by a ring 19 on a boss 20 on the inner side of the adjacent member. In the present instance the sections 18, 19 comprise cone rings for roller bearings, the antifriction rollers whereof are indicated at 21.

The bolts 14 not only hold the side members of the structure in alinement, but by means of the nuts 16 adjustment of the sections 19 of the respective roller bearings in accurate relation to the sections 18 can be readily effected in order to take up wear, as occasion may require. Such bearings permit free and easy oscillations, relative to each other, of the assembled elements comprising the bar, the spring and the shackle.

It is to be particularly noted that neither of the bushings 15 comes in contact with the adjacent bolt 14 nor with the side members 13, and that therefore the said bolt is not subject to friction or to wearing action on account of the oscillation of the shackle, but, instead, the stress is confined solely to the associated cones and rollers. Hence the wearing action between the moving parts of the shackle and its adjuncts is reduced to a minimum, and, at the same time, provision is had whereby the roller bearings can be adjusted longitudinally of the bolts in order to take up wear in the said bearings, and thus effectually preventing so-called "side slap" of the spring with its attendant rattling.

I preferably provide each of the bearing sections 18 with an annular lubricating packing 22 which serves to retain grease in, and to exclude sand or water from the bearing.

In previous types of shackles wherein the cross-bolts, or pins, constituted the bearings for the bushings, it was necessary to apply a lubricant not only to the contact points of the associated bolts and bushings but also between the said bushings and the side members of the shackle. This was a difficult and unreliable operation owing to the relatively slight oscillation of the shackle, and also to the entrance of sand and water between the side members and the bushings. Moreover, rapid wear, due to end thrust, took place between the bushings and the side members, thus allowing lateral movement of the spring with its attendant rattling. These objections are entirely eliminated by a shackle construction embodying my invention.

It is to be understood that I do not limit my invention to the exact details of construction herein disclosed, as the same may be modified within the principle of my invention and the scope of the appended claims.

I claim—

1. In a shackle, a pair of side supporting members, a pin element connecting said members in spaced parallel relation to each other, a bushing loosely encircling said pin element, a spring having one end interposed between the side members and fixed to the bushing, and bearings for the respective ends of the bushing, each of said bearings comprising two complementary sections with antifriction members therebetween, one of said sections being fast on the adjacent end of the bushing and the other section being fast on the proximate supporting member.

2. In a shackle, a pair of side supporting members, a pin element comprising a bolt adjustably connecting said members in spaced parallel relation to each other, a bushing encircling said bolt and spaced therefrom, a spring having one end interposed between the side members and fixed to the bushing, and bearings for the respective ends of the bushing, each of said bearings comprising two complementary sections with antifriction members interposed therebetween, one of said sections being fast on the adjacent end of the bushing and the other section being fast on the proximate supporting member.

3. In a shackle, a pair of side supporting members, a non-rotatable pin element connecting said members in spaced parallel relation to each other, a bushing loosely encircling said pin element, a spring having one end interposed between the side members and fixed to the bushing, the respective ends of said bushing extending beyond the spring, and bearings for said extending ends, each of said bearings comprising two complementary sections with antifriction members therebetween, one of said sections being fast on the adjacent end of the bushing and the other section being fast on the proximate supporting member.

4. A shackle comprising two side supporting members, a non-rotatable pin element connecting said members in spaced parallel relation to each other, an oscillatory mounting attachment loosely encircling said pin element, and bearings for the ends of the said attachment, each of said bearings comprising two complementary sections with antifriction members therebetween, one of said sections being fast on the adjacent end of the attachment and the other section being fast on the proximate supporting member.

5. The combination with a vehicle frame and a laminated supporting spring therefor, of a shackle flexibly connecting one end of the spring to the frame, said shackle comprising two side supporting members, non-rotatable pin elements connecting said members in spaced parallel relation to each other, bushings loosely encircling said pin elements, one of said bushings being fast in the frame element and the other bushing being fast to one end of the spring, and bearings for the respective ends of each of said bushings, each of said bearings comprising two complementary sections with antifriction members therebetween, one of said sections being fast on the adjacent end of the bushing and the other section being fast on the proximate supporting member.

6. In a shackle, a pair of side supporting members, a pin element connecting said members in spaced parallel relation to each other, a bushing loosely encircling said pin element and providing a mounting attachment, bearings for the respective ends of the said bushing, each of said bearings comprising two complementary sections with antifriction members therebetween, one of said sections being fast on the adjacent end of the bushing and the other section being fast on the proximate supporting member, and annular lubricating members encircling the respective bearing sections on the bushing.

7. In a device of the class described, the combination of a frame member, a spring, and a connection therebetween comprising tubular supports projecting from the eye of the spring and carrying conical bearing members on their ends, conical bearing members through which the frame is supported cooperating with the first-mentioned bearing members, and anti-friction rollers between said bearing members.

8. In a device of the class described, the combination of a frame member, a spring, and a connection therebetween comprising tubular supports projecting from the eye of the spring and carrying conical bearing members on their ends, conical bearing members through which the frame is supported cooperating with the first-mentioned bearing members, means for adjusting the relation of the cooperating bearing members, and anti-friction rollers between said cooperating bearing members.

9. In a device of the class described, the combination of a frame member, a spring, and a connection therebetween comprising supporting means non-rotatably arranged in the eye of the spring and projecting therefrom, conical bearing members on said supporting means, supporting means on said frame, conical bearing members on the last-mentioned supporting means, and shackle means having conical bearing members cooperating with the above-mentioned conical bearing members and through which said frame is connected with said spring.

10. In a device of the class described, the combination of a frame member, a spring, and a connection therebetween comprising supporting means non-rotatably arranged in the eye of the spring and projecting therefrom, conical bearings on said supporting means, supporting means on said frame, conical bearing members on the last-mentioned supporting means, and shackle means having conical bearing members cooperating with the above-mentioned conical bearing members and through which said frame is connected with said spring.

11. In a device of the class described, the combination of a frame member, a spring having an eye at one end, tubular supporting means non-rotatably aranged in the eye of the spring and projecting from the sides thereof, anti-friction bearings carried by the projecting portions of said tubular means, members having connection with said frame and cooperating with said bearings to transmit the frame load to the bearings, and a bolt loosely arranged in said tubular means and cooperating with said members to maintain them in their normal relation to said bearings.

12. In a device of the class described, the combination of a frame member, a spring having an eye at one end, tubular supporting means non-rotatably arranged in the eye of the spring and projecting from the sides thereof, anti-friction bearings having one of their races carried by the projecting portions of said tubular means, members connected with said frame member and co-operating with the other races of said bearings to transmit the load thereto and a bolt extending through said tubular means and said members to maintain the parts in their normal relation.

13. In a device of the class described, the combination of a frame member, a spring having an eye at one end, tubular supporting means non-rotatably arranged in the eye of the spring and projecting from the sides thereof, anti-friction bearings having one of their races carried by the projecting portions of said tubular means, an eye in said frame member, tubular supporting means non-rotatably arranged therein and projecting from the sides thereof, anti-friction bearings having one of their races carried by the projecting portions of the last-mentioned tubular means, shackle members cooperating with the other members of said bearing to transmit the load from the frame to the spring, and bolts extending through said eyes and maintaining the parts in their normal relation.

Signed at Cleveland in the county of Cuyahoga and State of Ohio this second day of December A. D. 1920.

ARCHER H. HARRIS.